United States Patent
Lynn et al.

(10) Patent No.: US 6,947,037 B1
(45) Date of Patent: Sep. 20, 2005

(54) METHOD AND APPARATUS FOR INTERFACING WITH INTELLIGENT THREE-DIMENSIONAL COMPONENTS

(75) Inventors: Patrick Lynn, Chicago, IL (US); John Fairley, Chicago, IL (US); Kamal Shah, Oakland, CA (US); Clay Graham, San Francisco, CA (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/187,284

(22) Filed: Nov. 5, 1998

(51) Int. Cl.⁷ .............................................. G06T 15/00
(52) U.S. Cl. ...................................................... 345/419
(58) Field of Search ................................ 345/419, 473

(56) References Cited

U.S. PATENT DOCUMENTS

| | | | | |
|---|---|---|---|---|
| 5,884,029 A | * | 3/1999 | Brush, II et al. | 395/200.32 |
| 5,889,951 A | * | 3/1999 | Lombardi | 395/200.49 |
| 5,974,253 A | * | 10/1999 | Nahaboo et al. | 345/701 |
| 5,977,978 A | * | 11/1999 | Carey et al. | 345/419 |
| 6,285,380 B1 | * | 9/2001 | Perlin et al. | 345/473 |
| 6,304,893 B1 | * | 10/2001 | Gish | 709/203 |
| 6,377,263 B1 | * | 4/2002 | Falacara et al. | 345/473 |

OTHER PUBLICATIONS

Tamiosso et al., Building Interactive Animations using VRML and JAVA, IEEE 1997, pp. 42–48.*

Divjak, Design of Hypertext Based Courseware with the Integrated JAVA and VRML Modules, IEEE 1998, pp. 178–181.*

Gray et al., Modern Languages and Microsoft's Component Object Model, Communications of the ACM, May 1998, vol. 41, pp. 55–65.*

Lecolinet, XXL: A Dual Approach for Building User Interfaces, ACM 1996, pp. 99–108.*

Canning et al., Interfaces for Strongly-Typed Object-Oriented Programming, OOPSLA 1989 Proceedings ACM, 1989, pp. 457–467.*

Dukovic et al., An Evaluation of Object-Based Programming with Visual Basic, IEEE 1995, pp. 346–351.*

* cited by examiner

Primary Examiner—Sumati Lefkowitz
Assistant Examiner—Motilewa Good-Johnson
(74) Attorney, Agent, or Firm—Cooper & Dunham LLP (57) ABSTRACT

A method of interfacing with a three-dimensional object that is displayed includes the steps of defining the three-dimensional object as a component with a component interface, displaying the component interface and interfacing with the three-dimensional object through the component interface. The component intrinsically contains an intelligent content. The present invention also provides for an apparatus with means for accomplishing the steps of the present invention as well as a computer system and computer readable medium implementing the method of the present invention.

35 Claims, 5 Drawing Sheets

METHOD AND APPARATUS FOR INTERFACING WITH INTELLIGENT THREE-DIMENSIONAL COMPONENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to interactive multimedia, and more particularly, to a method and apparatus for interfacing with intelligent three-dimensional objects.

2. Description of Related Art

The term "multi media" includes many technologies such as video and interactive three-dimensional ("3D") technology. Interactive 3D has gained recent popularity due to numerous benefits over two-dimensional technology as well as advantages over plain text or video. First, interactive 3D is unlike a 3D movie in that interactive 3D contains content that is an interactive experience. That is, 3D content, used in conjunction with a computer, enables a user to move objects on the screen and explore different spaces on the screen. A user is able to independently examine objects and wander throughout a "world," i.e. a 3D space. For example, a typical training video teaching a person how to assemble a part would be rerun several times in order to fully understand the assembly process. However, using interactive 3D, a user assembles the item and then may take the item apart and put the item back together until the assembly process is truly understood. A second advantage of using interactive 3D is that a user's viewpoint belongs to the user, not to the author of the content. Thus, a user may rotate an object or walk around the object to change the view angle. Thirdly, a user may also view objects in different sequences as opposed to watching such objects sequentially which is what occurs in a video.

Figure 1:
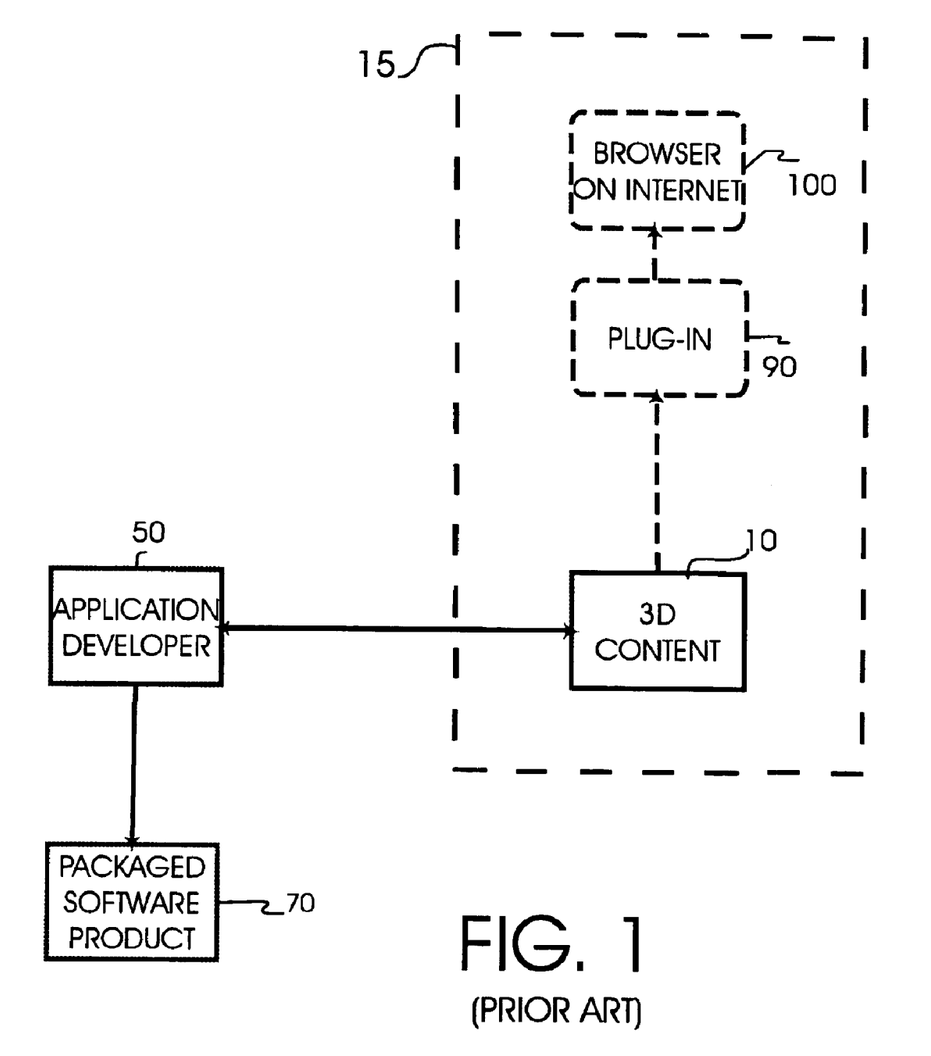
FIG. 1 is a prior art block diagram view of the typical use of 3D content.

Even with the popularity of interactive 3D, the widespread use of interactive 3D is limited by storage, delivery and application integration limitations of present-day interactive 3D. 3D content, which is generally the programming language creating a 3D object, is typically stored as a file on a server and then visualized to a user by an application ("plug-in") over a data network, such as the Internet. This model is known as a file server model. In general, the file server model is shown in prior art FIG. 1 within the dashed line 15. Prior art FIG. 1 is a block diagram view of a typical use of 3D content 10. In FIG. 1, the file server model 15 includes the 3D content 10 developed by a content developer in a programming language. The 3D content is typically written in a programming language known as Virtual Reality Modeling Language ("VRML"). A description of VRML is available in the publication "The Virtual Reality Modeling Language," ISO/IEC 14772-1: 1997, incorporated herein by reference. A brief example of VRML is provided below in prior art FIG. 2. Returning to prior art FIG. 1, the content developer prepares, in VRML, a file that contains the 3D content to be viewed. A browser on the Internet 100 that wishes to view the 3D content 10 uses a "plug-in" application 90 that is generally loaded into the browser on the Internet 100 in order to visualize the 3D content 10 stored as a file.

A problem with the 3D content stored as a file is that such 3D content is not able to be accessed by a user, such as an application developer 50, that wishes to create an application to interact with the 3D content 10, unless such developer knows VRML. In essence, the 3D content 10 written in VRML is opaque, or not accessible by the application developer, who wishes to use the 3D content to create a packaged software product 70. Thus, the storage and delivery of the 3D content as a file is a limitation of the file server model since application developers must know VRML to interact with the 3D content.

Figure 2:
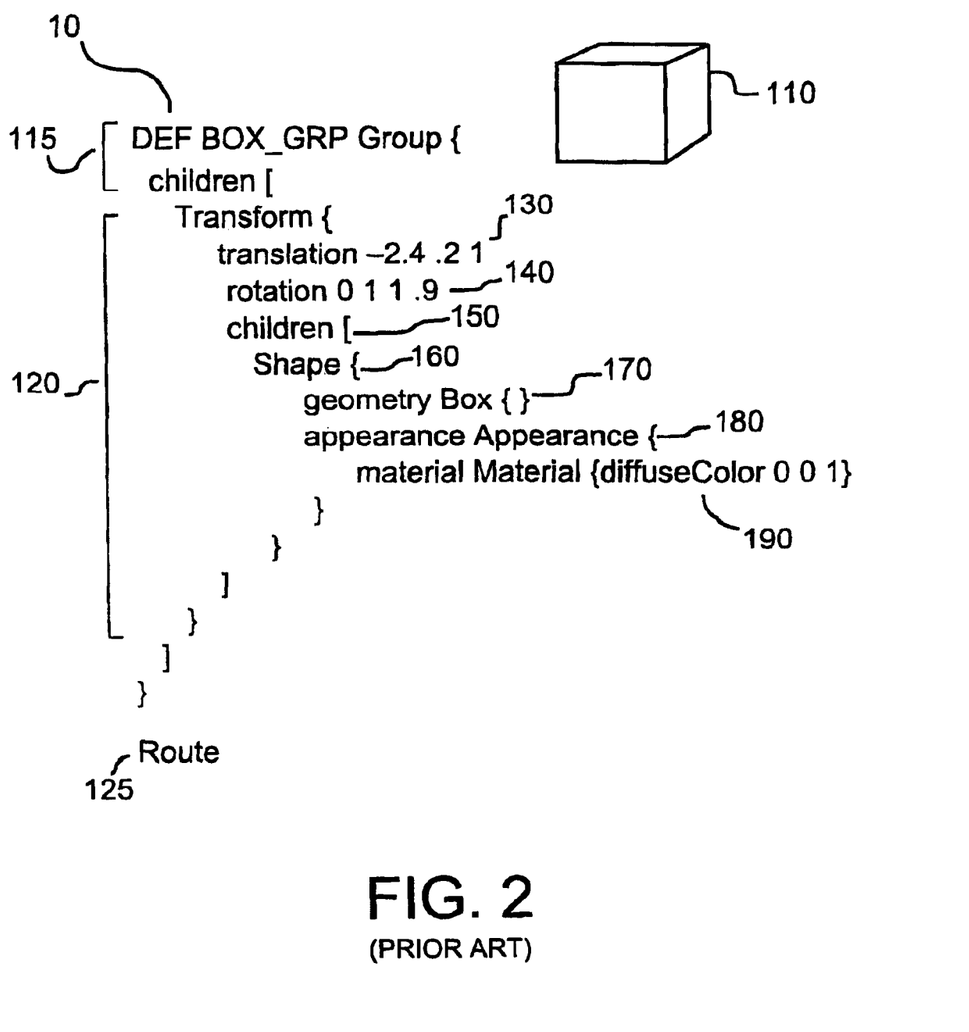
FIG. 2 is a prior art VRML representation of a box.

Prior art FIG. 2 is a brief example of VRML that demonstrates the type of understanding of VRML needed by an application developer to create an application that interfaces with 3D content. Prior art FIG. 2 is an example of VRML defining a box 110. In FIG. 2, the 3D content 10 defines the box 110 that an application developer 50 would wish to incorporate into a graphical scene as part of a packaged software product 70 (FIG. 1). To permit the application developer 50 to use the 3D content 10 in the packaged software product 70 being developed, the application developer 50 must be sufficiently familiar with VRML.

VRML is a sophisticated programming language that many application developers 50 may not understand. In FIG. 2, a box 110 is defined by the VRML below the box 110. In general, the box 110 is considered an object that the VRML is able to create, change properties of and connect with other objects. At section 115, VRML has created a new object labeled DEF BOX_GRP. In the next section 120, the Properties 120 of the box are defined and changed. Specifically, at VRML line 130, the box is translated to a certain 3D coordinate (4 .2 1.) At VRML line 140, the box is rotated to a certain orientation (0 1 1.9). At VRML line 150, a subgroup labeled Children is defined to include a shape, at VRML line 160, having the geometry of a box, at VRML line 170, and a particular appearance from VRML line 180. A certain material at VRML 190 is then defined including a particular color. A third section would then create a Route 125 that would match, move or coordinate the box 110 with other objects within the graphical scene of the plugin application (FIG. 1). Thus, VRML provides 3D content that contains Groups 115, Properties 120 and Routes 125 that permit the box 110 to be defined.

However, even if the application developer 50 (FIG. 1) is somewhat familiar with VRML, the integration of the 3D content 10 to the application being developed by the application developer 50 to create a packaged software product 70 is very difficult due to the complexity of VRML. An application developer must study the VRML to locate the 3D content needed and integrate those fields into the application being developed. This process is very complicated and time consuming. A need therefore exists for a user to be able to quickly and easily access different 3D content in VRML without knowing VRML or having to locate specifications and operations in the 3D content.

One attempted solution to this application integration problem has been the use of an External Authoring Interface (EAI). A description of EAI is available in the publication "External Authoring Interface," ISO/IEC 14772-1: 1997 Appendix B, incorporated herein by reference. EAI has attempted to expose the 3D content to the application but has failed to provide a generic method for providing application integration. EAI has failed since EAI, like VRML itself, is very complicated and difficult to understand. A second problem with EAI is that it is limited in scene graph management. That is, EAI is not able to maintain direct pointers to objects in a scene and is also not able to determine the properties of an object unless the application developer knows the complex VRML. Thirdly, EAI does not provide the application developer with the ability to easily interface with the Groups, Properties and Routes of each object in the 3D content. EAI therefore has application integration limitations that does not solve the need for the integration between 3D content and an application being developed by an application developer (or user) wishing to interface with the 3D content.

A second proposed solution to this application integration problem has been attempted by Microsoft Corporation of Redmond, Wash. in a product commercially known as Chromeffects™. Chromeffects™ is an interactive media technology that is intended to improve the quality and performance of interactive media for the Internet and desktop applications. Chromeffects™ is based on HyperText MarkUp Language (HTML) and Extensible Markup Language (XML) and represents 3D content in a "component" model. A component model to 3D content is an evolution from the object-oriented model that has previously been used. The component model to 3D content treats a 3D object as a simple component by exposing only a group of basic functions to describe the 3D object. That is, while the object-oriented model provides to a user all details of an object to be modeled, a component approach only provides to the user a particular set of functions that functionally and simply describe the object in order to simplify the interaction between the user and the object.

A problem with Chromeffects™ is that the 3D content, based on HTML and XML, needs additional external scripting and interface scripting to provide the needed set of functions. Thus, the 3D content, created in HTML and XML, is not "intelligent," i.e. intrinsically contained within the 3D content, but instead needs additional content scripting and interface scripting. Such additional scripting takes more time and comes at a higher cost and complexity. Thus, Chromeffects™ is limited by the additional scripting or "intelligence" provided by the scripting to properly integrate the 3D content to an application.

A need therefore remains to provide an interface to 3D content that does not require a user to know VRML and that does not require additional external and interface scripting.

SUMMARY OF THE INVENTION

The present invention, as described herein, provides a method of interfacing with a three-dimensional object that is displayed. The method includes the steps of defining the three-dimensional object as a component having a component interface, displaying the component interfaces and then interfacing with the three-dimensional object through the component interfaces. The component intrinsically contains an intelligent content.

The present invention also provides for an apparatus for interfacing with the three-dimensional object that is displayed by providing means for performing each step of the method described.

Also provided herein are alternative embodiments for the present invention including a computer system for interfacing with the three-dimensional object that is displayed that includes a display means, a memory for storing a computer program for interfacing with the three-dimensional object displayed on a display means and a processor for executing the computer program in conjunction with the display means. The computer program is executed to perform the method of interfacing with the three-dimensional object that is displayed.

The present invention also provides for a computer-readable medium that has a computer program stored on the medium so that, when the medium is loaded onto a computer, the computer is caused to perform a function of interfacing with a three-dimensional object displayed on the computer. The computer interfaces with the three-dimensional object by performing the steps of defining the three-dimensional object as a component with a component interface, displaying the component interface and interfacing with the three-dimensional object through the component interface. The component intrinsically contains an intelligent content.

BRIEF DESCRIPTION OF THE DRAWINGS

The present invention will be described with respect to particular embodiments thereof, and reference will be made to the drawings in which like numbers designate like parts and in which.

DETAILED DESCRIPTION

In the following description, various embodiments of the method of the present invention for interfacing with intelligent 3D components will be provided. Alternative embodiments of the present invention will also be provided that identify practical applications of the present invention. Thus, while the present invention is directed to a method of interfacing with a three-dimensional object that is displayed, alternative embodiments implementing that method, including an apparatus, a computer system and a computer-readable medium, are also provided to practically apply and functionally detail the method of the present invention. It is understood, however, that the present invention is generally directed to a method of interfacing with a 3D object that is displayed by performing the steps of defining the three-dimensional object as a component with a component interface, displaying the component interface and interfacing with the 3D object through the component interface. The component intrinsically contains an intelligent content. The present invention will now be described in detail with reference to FIGS. 3–5.

Figure 3:
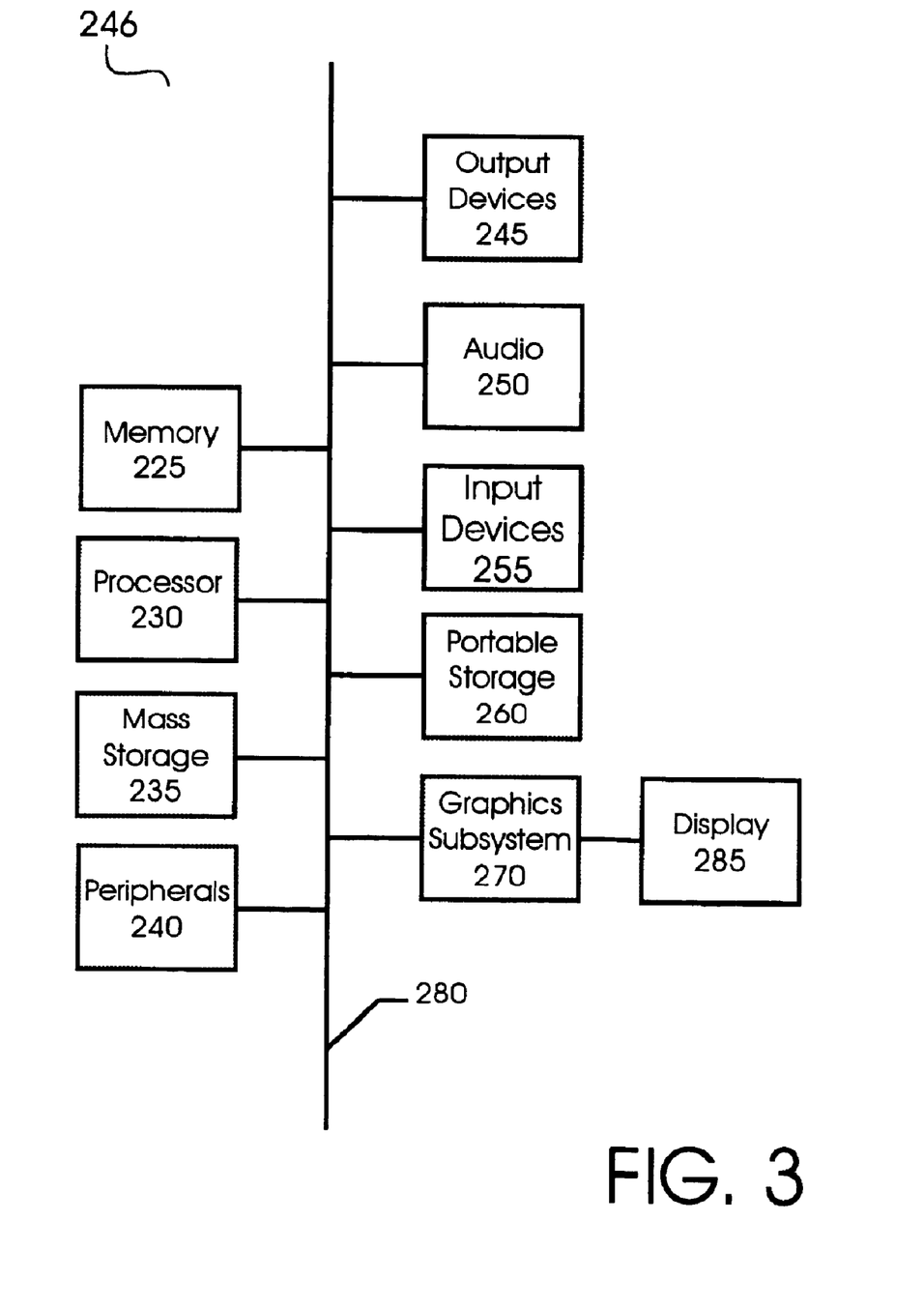
FIG. 3 is a high-level block diagram of a computer system incorporating the method of interfacing of the present invention.

FIG. 3 illustrates a high-level block diagram of a computer system which is used, in one embodiment, to implement the method of the present invention. The computer system 246 of FIG. 3 includes a processor 230 and memory 225. Processor 230 may contain a single microprocessor, or may contain a plurality of microprocessors for configuring the computer system as a multi-processor system. Memory 225, stores, in part, instructions and data for execution by processor 230. If the system of the present invention is wholly or partially implemented in software, including a computer program, memory 225 stores the executable code when in operation. Memory 225 may include banks of dynamic random access memory (DRAM) as well as high speed cache memory.

The system of FIG. 3 further includes a mass storage device 235, peripheral device(s) 240, input device(s) 255, portable storage medium drive(s) 260, a graphics subsystem 270 and a display 285. For purposes of simplicity, the components shown in FIG. 3 are depicted as being connected via a single bus 280. However, the components may be connected through one or more data transport means. For example, processor 230 and memory 225 may be connected via a local microprocessor bus, and the mass storage device 235, peripheral device(s) 240, portable storage medium drive(s) 260, and graphics subsystem 270 may be connected via one or more input/output (I/O) buses. Mass storage device 235, which is typically implemented with a magnetic disk drive or an optical disk drive, is a non-volatile storage device for storing data and instructions for use by processor 230. In another embodiment, mass storage device 235 stores the computer program implementing the method of the present invention for interfacing with a three-dimensional object for purposes of loading such program to memory 225. The method of the present invention also may be stored in processor 230.

Portable storage medium drive 260 operates in conjunction with a portable non-volatile storage medium, such as a floppy disk, or other computer-readable medium, to input and output data and code to and from the computer system of FIG. 3. In one embodiment, the method of the present invention for interfacing with a three-dimensional object is stored on such a portable medium, and is input to the computer system 246 via the portable storage medium drive 260. Peripheral device(s) 240 may include any type of computer support device, such as an input/output (I/O) interface, to add additional functionality to the computer system 246. For example, peripheral device(s) 240 may include a network interface card for interfacing computer system 246 to a network, a modem, and the like.

Input device(s) 255 provide a portion of a user interface. Input device(s) 255 may include an alpha-numeric keypad for inputting alpha-numeric and other key information, or a pointing device, such as a mouse, a trackball, stylus or cursor direction keys. Such devices provide additional means for interfacing with the three-dimensional objects in the method of the present invention. In order to display textual and graphical information, the computer system 246 of FIG. 3 includes graphics subsystem 270 and display 285. Display 285 may include a cathode ray tube (CRT) display, liquid crystal display (LCD), other suitable display devices, or means for displaying, that enables a user to view a three-dimensional object. Graphics subsystem 270 receives textual and graphical information and processes the information for output to display 285. Display 285 can be used to display a three-dimensional object, component interfaces and/or display other information that is part of a user interface. The display 285 provides a practical application of the method of interfacing with a three-dimensional object of the present invention since the method of the present invention may be directly and practically implemented through the use of the display 285. The system 246 of FIG. 3 also includes an audio system 250. In one embodiment, audio system 250 includes a sound card that receives audio signals from a microphone that may be found in peripherals 240. Additionally, the system of FIG. 3 includes output devices 245. Examples of suitable output devices include speakers, printers, and the like.

The devices contained in the computer system of FIG. 3 are those typically found in general purpose computer systems, and are intended to represent a broad category of such computer components that are well known in the art. The system of FIG. 3 illustrates one platform which can be used for practically implementing the method of the present invention. Numerous other platforms can also suffice, such as Macintosh-based platforms available from Apple Computer, Inc., platforms with different bus configurations, networked platforms, multi-processor platforms, other personal computers, workstations, mainframes, navigation systems, and the like.

Alternative embodiments of the use of the method of the present invention in conjunction with the computer system 246 further include using other display means for the monitor, such as CRT display, LCD display, projection displays, or the like. Likewise, any similar type of memory, other than memory 225, may be used. Other interface means, in addition to the component interfaces, may also be used including alpha-numeric keypads, other key information or any pointing devices such as a mouse, trackball, stylus, cursor or direction key.

Figure 4:
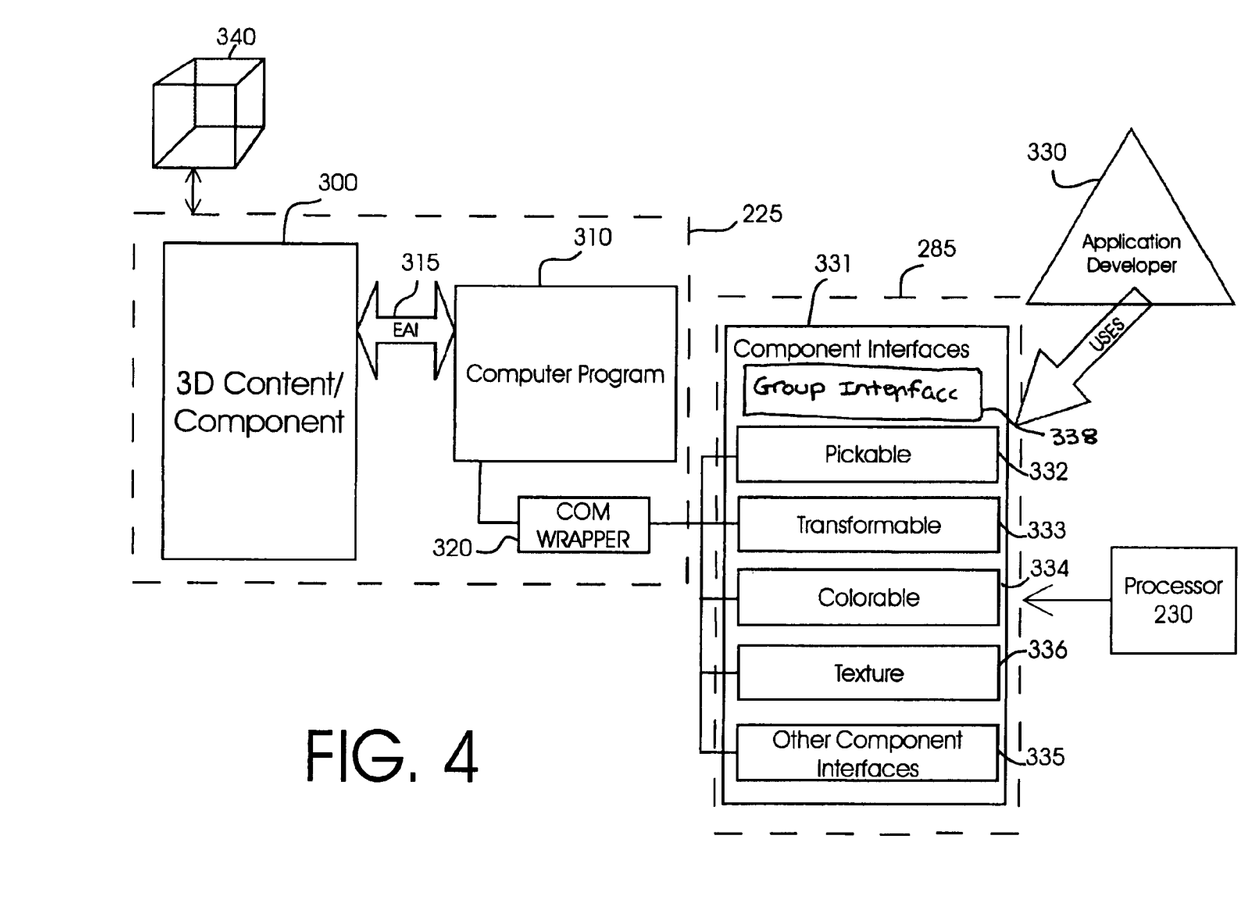
FIG. 4 is a block diagram view of an embodiment of the method of interfacing with a three-dimensional object of the present invention.

FIG. 4 is a block diagram view of an embodiment of the method of interfacing with a three-dimensional object of the present invention. In FIG. 4, a sample three-dimensional object 340 is shown to be a cube. Such a three-dimensional object is displayed in any display means, including CRT display, LCD display, projection displays, monitors or the like. It is understood, however, that the three-dimensional object to be interfaced with using the method of the present invention may be any three-dimensional object. The three-dimensional object 340 is defined as a component using a three-dimensional content language, such as VRML. 3D content 300 is the programming language equivalent of a 3D object 340 viewed. By defining the 3D object as a component, the component is treated as a simple component, rather that a detailed object such as is used in an object-oriented description of a 3D object. In an alternative embodiment, the 3D content language is any virtual reality programming language that is "intelligent", that is, does not require additional scripting for content or interfacing with applications. It is understood, however, that other 3D content languages may be used as long as that 3D content language intrinsically contains an "intelligent" content, i.e., no additional external scripting or interface scripting is required to interface or access the 3D content. "Intelligent" 3D content is therefore 3D content that contains, intrinsically, within the language, the necessary content to interface with a user, without the need for additional scripting. The 3D content 300 is typically prepared by a content developer (not shown). In one embodiment, the 3D content 300 is practically implemented in a device of the computer system 246 (FIG. 3) in, for example, the memory 225 of the computer system of FIG. 3. It is further understood that the 3D content 300 as well as the computer program 310, the EAI 315 and the COM wrapper 320 may also all be located within the memory. However, it is understood that the 3D content 300 may also be stored in portions of the computer system of FIG. 3 that are capable of containing memory such as (in FIG. 3) processor 230, mass storage device 235 and portable storage medium drive(s) 260.

Computer program 310 contains executable software that generates the component interfaces 331, to the 3D content 300, using the EAI 315 and COM wrapper 320 bridges. As previously discussed, the computer program 310 is, in one embodiment, located on the various storage means of FIG. 3 (e.g., memory 225, mass storage 235 or portable storage 260). In other embodiments, computer program 310 may be located on a computer-readable medium, such as a floppy disk of other portable or non-portable storage device. In still further embodiments, as discussed below, the computer program 310 may be located on an electronic signal transferred over a network, such as the Internet. The computer program 310 generates the component interfaces 331 on a display 285 and is able to interface with a user/application developer 330, through the component interfaces 331, to the 3D content 300. The 3D content 300 uses the EAI 315 to expose a scene graph formed by the 3D content 300 to an application developer 330. A description of EAI is available in the publication "External Authoring Interface", ISO/IEC 14772-1: 1997 Appendix B, and is incorporated herein by reference.

The COM wrapper 320, also stored in similar locations as computer program 310, such as memory 225, is a universal interface that "wraps" around the computer program 310 to permit the computer program 310 to communicate with the 3D content 300 through the EAI 315. The COM wrapper is an industry standard found in the publication, "The Component Object Model Specification," Draft Version 0.9, Oct. 24, 1995 Microsoft Corporation and Digital Equipment Corporation, and is incorporated herein by reference. The 3D content 300, EAI 315, computer program 310 and COM wrapper 320 are all located with storage of, for example, the computer system 246 or alternative storage devices as previously described. It is understood that the method of interfacing with a three-dimensional device of the present invention is practically implemented in one embodiment, in the computer system 246, but need not necessarily be implemented in such system as long as the method steps, as claimed below, are accomplished.

The component interfaces 331 are part of the computer program 310, however are shown in FIG. 4 as separate from computer program 310 since the component interfaces are typically displayed in a display means 285, while the computer program 310 is not. The display means for displaying the component interfaces 331 includes a cathode ray tube (CRT) display, liquid crystal (LCD) display, a monitor (such as a computer monitor), a projection screen or any other type of screen, or monitor device that visually displays the 3D object. The component interfaces 331 include group interface 338, pickable interface 332, transformable interface 333, colorable interface 334, texture interface 336 and other component interfaces 335.

The component interfaces 331 provide the following functions to access particular content in 3D content 300. The pickable interface 332 provides access to mouse events in the 3D content 300, as such mouse events are commonly available in VRML. The transformable interface 333 provides access to the position, scale or rotation properties of the 3D content 300. The colorable interface 334 provides access to the color and material properties of the 3D content 300. The texture interface 336 provides access to the application of images to the surface of the 3D content 300. The group interface 338 provides access to the manipulation of the object scene graph hierarchy as is commonly known in the art.

These component interfaces are displayed on a display for a user such as the application developer 330 to interface with a three-dimensional object, such as object 340 (FIG. 3). A processor 230 is used to execute the computer program 310 in conjunction with the display 285 in order to perform the method of the present invention. It is understood that while only a limited list of component interfaces is described herein, component interfaces may include an unlimited number of interfaces that functionally describe a 3D object. An example of such component interfaces are provided in Table 2 below.

The component interface 331 also includes other component interfaces 335 which are known as extendable computer interfaces 335. The other component interfaces 335 permit an application developer or user to interface with the three-dimensional object in a manner other than the standard options listed as component interfaces 332–334, 336, 338. An extensive list of extension interfaces are provided in the example of Table 3. The advantage of having extension interfaces is that the application developer 330 or user is able to interface with a three-dimensional object in a manner outside of the listed component interfaces 331. It is understood, however, that additional other component interfaces, for extending the interface with a user, may be used.

In use, a 3D object 340 is displayed on a display means 235, such as a monitor, CRT display, LCD display, screen, projection device or the like. Along with the 3D object 340, the display 285 also displays the component interfaces 331 through the use of processor 230 that executes the computer program 310 to display the component interfaces 331. A user, or application developer 330 who wishes to interface with the 3D object 340, is able to choose, from the component interfaces 331, which interface (332–336, 338) the user wishes to access. Upon choosing an interface, the computer program interfaces with the component interfaces 331, through COM wrapper 320, and then interfaces with the 3D content 300, through EAI 315, to access the appropriate "intelligent" content of the 3D content 300. An example of the 3D content 300 is shown in Table 1 below.

Significant advantages exist for the method of the present invention. First, the application developer 330 need not know VRML (contained in the 3D content) and the application may easily interface with the VRML to interface with the three-dimensional object 340 to develop additional 3D applications to the 3D object. Second, the application developer or user need not do additional scripting in order to provide additional 3D content or for interfacing with the 3D content since the 3D content is "intelligent," that is the 3D content, or component, intrinsically contains an intelligent content. Thus, significant time saving occurs. Third, the embodiment of the method of the present invention shown in FIG. 4 permits a user to extend the component interfaces as shown by the other component interfaces 335. A user is therefore not limited by the "short list" of component interfaces 331. A further advantage of the present invention is that the three-dimensional object may be any object that is already defined in VRML 3D content 300 and, as such, is a component to which any of the component interfaces may apply regardless of the three-dimensional object to which an interface is necessary.

Table 1 below is an example of the 3D content 300 of FIG. 4. The example is not intended to be either a compilable or executable program, a complete program language or contain all the features discussed above. It is a VRML illustrative of the various functions and processes implemented in the method of interfacing of the present invention that is consistent with the principles of the above-described invention. Table 1, as well as Tables 2 and 3, are subject to copyright protection to the extent described above in the copyright notice.

TABLE 1

```
3D Content:
PROTO SpinningBox
[
#To store any proto info
exposedField         MFString protoInfo                              ["G3dBox"]
#Transform fields with default values
#IG3dTransformableObj
exposedField         SFVec3f        center                                   0 0 0
exposedField         SFVec3f        translation        0 0 0
exposedField         SFRotation     rotation                       0 1 0 0
exposedField         SFVec3f        scale                                    1 1 1
exposedField         SFRotation     scaleOrientation               0 0 1 0
field                SFVec3f        bboxCenter                     0 0 0
field                SFVec3f        bboxSize           -1 -1 -1
#IG3dGroup
eventIn MFNode addChildren
eventIn MFNode removeChildren
exposedField MFNode children [ ]
#Material fields
#IG3dColoredObj
exposedField         SFFloat        ambientIntensity   0.2
exposedField         SFColor        diffuseColor                             .8 .8 .8
exposedField         SFColor        emissiveColor      0 0 0
exposedField         SFFloat        shininess          0.2
exposedField         SFColor        specularColor      0 0 0
exposedField         SFFloat        transparency       0
#ImageTexture fields
#IG3dTexture
exposedField         MFString       url                            [ ]
field SFBool         repeatS        TRUE
field SFBool         repeatT        TRUE
#textureTransform fields
exposedField         SFVec2f        centerTexture      0 0
exposedField         SFFloat        rotationTexture    0
exposedField         SFVec2f        scaleTexture       1 1
exposedField         SFVec2f        translationTexture 0 0
#TouchSensor
#IG3dMouseEvents
exposedField         SFBool         enabled                        FALSE
eventOut     SFBool                 isActive
eventOut     SFBool                 isOver
eventOut     SFTime                 touchTime
eventOut     SFVec3f        hitPoint_changed
#Box fields
#IG3dBox
field                SFVec3f        size                           2 2 2
#IG3dExtension
exposedField SFBool animationEnabled FALSE
exposedField SFFloat animationDuration 10
#Extension MetaData describing the additional Extension properties
exposedField MFString Properties
[
        "animationEnabled", "Enable the Animation", "SFBool",
        "animationDuration", "The duration of the animation", "SFFloat"
]
]
{
DEF TRANSFORM Transform {
        center IS center
        translation IS translation
        rotation IS rotation
        scale IS scale
        scaleOrientation IS scaleOrientation
bboxCenter IS bboxCenter
bboxSize IS bboxSize
children [
                Shape {
                        appearance Appearance {
                                material Material {
                ambientIntensity IS ambientIntensity
    diffuseColor IS    diffuseColor
    emissiveColor IS   emissiveColor
    shininess IS    shininess
    specularColor IS   specularColor
    transparency IS    transparency
                                }
                        texture ImageTexture {
                                #for simplicity, no
                                #MovieTextures or PixelTextures
```

TABLE 1-continued

```
                                        #we could expose the texture
                                        #node to all these
                                        url IS url
                                        repeatS IS repeatS
                                        repeatT IS repeatT
                            }
    textureTransform TextureTransform{
    center IS centerTexture
    rotation IS rotationTexture
    scale IS scaleTexture
    translation IS translationTexture
}
                            } #Appearance
                            geometry Box {
                                        size IS size
                            }
                }
                TouchSensor
                {
                            enabled IS enabled
                            isActive IS isActive
                            isOver IS isOver
                            touchTime IS touchTime
                            hitPoint_changed IS hitPoint_changed
                }
                Group
                {
                            removeChildren IS removeChildren
                            addChildren IS addChildren
                            children IS children
                }
} #children
        DEF TIMER TimeSensor {
                    enabled IS animationEnabled
                    loop TRUE
                    cycleInterval IS animationDuration
        }
        DEF INTERPOLATOR OrientationInterpolator{ #for rotation
                    key [0,.333333,.666667, 1]
                    keyValue [0 1 0 0,0 1 0 -2.09439,0 1 0 -4.18879,0 1 0 -6.28318]
        }
        ROUTE TIMER fraction_changed TO INTERPOLATOR.set_fraction
        ROUTE INTERPOLATOR value_changed TO TRANSFORM.set_rotation
} #transform
}#proto definition
```

Table 2 below is an example of the component interfaces 331 of the present invention. The example is not intended to be a compilable or executable program, a completed program language or contain all the features discussed herein, but is illustrative of various functions and processes of the method of the present invention.

TABLE 2

```
Component Interfaces:
    [
        object,
        uuid(A20A988C-B7FC-11D1-B0A6-00A024CBE637),
        dual,
        helpstring("IG3dGroup Interface").
        pointer_default(unique)
    ]
    interface IG3dGroup : IUnknown
    {
        [id(1), helpstring("method AddChild")]
            HRESULT AddChild(LPUNKNOWN pObj);
        [id(2), helpstring("method GetChild")]
            HRESULT GetChild(int idx, LPUNKNOWN* ppObj);
        [id(3), helpstring("method RemoveChild")]
            HRESULT RemoveChild(int idx);
        [id(4), helpstring("method RemoveChildByRef")]
            HRESULT RemoveChildByRef(LPUNKNOWN pUnk);
        [id(5), helpstring("method RemoveAllChildren")]
            HRESULT RemoveAllChildren( );
        [id(6), helpstring("method RenderChildren")]
            HRESULT RenderChildren(IG3dContext* pContext);
        [id(7), helpstring("method GetNumChildren")]
```

TABLE 2-continued

```
            HRESULT GetNumChildren(int* pNum);
};
[
    object,
    uuid(42D25EC0-B98F-11d1-B0A6-00A024CBE637),
    dual,
    helpstring("IG3dColoredObj Interface"),
    pointer_default(unique)
]
interface IG3dColoredObj : IUnknown
{
    [propget, id(1), helpstring("property DiffuseColor")]
        HRESULT DiffuseColor([out, retval] OLE_COLOR *pVal);
    [propput, id(1), helpstring("property DiffuseColor")]
        HRESULT DiffuseColor([in] OLE_COLOR newVal);
    [propget, id(2), helpstring("property AmbientIntensity")]
        HRESULT AmbientIntensity([out, retval] float *pVal);
    [propput, id(2), helpstring("property AmbientIntensity")]
        HRESULT AmbientIntensity([in] float newVal);
    [propget, id(3), helpstring("property EmissiveColor")]
        HRESULT EmissiveColor([out, retval] OLE_COLOR *pVal);
    [propput, id(3), helpstring("property EmissiveColor")]
        HRESULT EmissiveColor([in] OLE_COLOR newVal);
    [propget, id(4), helpstring("property Shininess")]
        HRESULT Shininess([out, retval] float *pVal);
    [propput, id(4), helpstring("property Shininess")]
        HRESULT Shininess([in] float newVal);
    [propget, id(5), helpstring("property SpecularColor")]
        HRESULT SpecularColor([out, retval] OLE_COLOR *pVal);
    [propput, id(5), helpstring("property SpecularColor")]
        HRESULT SpecularColor([in] OLE_COLOR newVal);
    [propget, id(6), helpstring("property Transparency")]
        HRESULT Transparency([out, retval] float *pVal);
    [propput, id(6), helpstring("property Transparency")]
        HRESULT Transparency([in] float newVal);
};
[
    object,
    uuid(D198B9A0-BA67-11d1-B0A6-00A024CBE637),
    dual,
    helpstring("IG3dTransformableObj Interface"),
    pointer_default(unique)
]
interface IG3dTransformableObj : IUnknown
{
    [propget, id(1), helpstring("property Center")]
        HRESULT Center([out, retval] LPUNKNOWN *pVal);
    [propput, id(1), helpstring("property Center")]
        HRESULT Center([in] LPUNKNOWN newVal);
    [id(2), helpstring("method put_Rotation")]
        HRESULT put_Rotation(LPUNKNOWN pRot);
    [id(3), helpstring("method get_Rotation")]
        HRESULT get_Rotation(IG3dRotation** pRot);
    [propget, id(4), helpstring("property Scale")]
        HRESULT Scale([out, retval] LPUNKNOWN *pVal);
    [propput, id(4), helpstring("property Scale")]
        HRESULT Scale([in] LPUNKNOWN newVal);
    [id(5), helpstring("method put_ScaleOrientation")]
        HRESULT put_ScaleOrientation(LPUNKNOWN pRot);
    [id(6), helpstring("method get_ScaleOrientation")]
        HRESULT get_ScaleOrientation(IG3dRotation** ppRot);
    [propget, id(7), helpstring("property Translation")]
        HRESULT translation([out, retval] LPUNKNOWN *pVal);
    [propput, id(7), helpstring("property Translation")]
        HRESULT Translation([in] LPUNKNOWN newVal);
    [propget, id(8), helpstring("property BBoxCenter")]
        HRESULT BBoxCenter([out, retval] LPUNKNOWN *pVal);
    [propput, id(8), helpstring("property BBoxCenter")]
        HRESULT BBoxCenter([in] LPUNKNOWN newVal);
    [propget, id(9), helpstring("property BBoxSize")]
        HRESULT BBoxSize([out, retval] LPUNKNOWN *pVal);
    [propput, id(9), helpstring("property BBoxSize")]
        HRESULT BBoxSize([in] LPUNKNOWN newVal);
    [propget, id(10), helpstring("property ScaleFactor")]
        HRESULT ScaleFactor([out, retval] LPUNKNOWN *pVal);
    [propput, id(10), helpstring("property ScaleFactor")]
        HRESULT ScaleFactor([in] LPUNKNOWN newVal);
};
[
```

TABLE 2-continued

```
        object,
        uuid(889ED240-CE15-11d1-B0A6-00A024CBE637),
        dual,
        helpstring("IG3dTexture Interface"),
        pointer_default(unique)
    ]
    interface IG3dTexture : IUnknown
    {
        [id(1), helpstring("method put_Center")]
            HRESULT put_Center(float x, float y);
        [id(2), helpstring("method get_Center")]
            HRESULT get_Center(float* x, float* y);
        [propget, id(3), helpstring("property Rotation")]
            HRESULT Rotation([out, retval] float *pVal);
        [propput, id(3), helpstring("property Rotation")]
            HRESULT Rotation([in] float newVal);
        [id(4), helpstring("method put_Scale")]
            HRESULT put_Scale(float x, float y);
        [id(5), helpstring("method get_Scale")]
            HRESULT get_Scale(float* x, float* y);
        [id(6), helpstring("method put_Translation")]
            HRESULT put_Translation(float x, float y);
        [id(7), helpstring("method get_Translation")]
            HRESULT get_Translation(float* x, float* y);
        [id(8), helpstring("method SetTextureType")]
            HRESULT SetTextureType(int iType);
        [propget, id(9), helpstring("property Url")]
            HRESULT Url([out, retval] BSTR *pVal);
        [propput, id(9), helpstring("property Url")]
            HRESULT Url([in] BSTR newVal);
        [propget, id(10), helpstring("property RepeatS")]
            HRESULT RepeatS([out, retval] BOOL *pVal);
        [propput, id(10), helpstring ("property RepeatS")]
            HRESULT RepeatS([in] BOOL newVal);
        [propget, id(11), helpstring("property RepeatT")]
            HRESULT RepeatT([out, retval] BOOL *pVal);
        [propput, id(11), helpstring("property RepeatT")]
            HRESULT RepeatT([in] BOOL newVal);
        [id(12), helpstring("method GetTextureType")]
            HRESULT GetTextureType(int* piType);
    };
    interface IG3dPickable : IUnknown
    {
        [propget, id(1), helpstring("property PickHandler")]
            HRESULT PickHandler([out, retval] LPUNKNOWN *pVal);
        [propput, id(1), helpstring("property PickHandler")]
            HRESULT PickHandler([in] LPUNKNOWN newVal);
    };
    [
        object,
        uuid(CC5C92C0-DDF5-11d1-B0A5-00A024CBE637),
        dual,
        helpstring("IG3dPickHandler Interface"),
        pointer_default(unique)
    ]
    interface IG3dPickHandler : IUnknow
    {
        [id(1), helpstring("method OnPick")]
            HRESULT OnPick(WORD wMouseMsg, LPUNKNOWN pUnkObj);
    };
    [
        object,
        uuid(48DE9F34-DE24-11D1-A2FC-0000C0D05EF9),
        dual,
        helpstring("IG3dColorBvr Interface"),
        pointer_default(unique)
    ]
```

Table 3 below is an example of the other component interfaces 335 of FIG. 4 that enable a user to extend the component interfaces 331. The example is not intended to be either a compilable or executable program, a complete program language or contain all the features discussed above. It is a VRML illustrative of the various functions and processes implemented in the method of interfacing of the present invention that is consistent with the principals of the above-described invention. The other component interfaces 335 generally include the following extensions: a smartproperty list, a smartproperty, a smartwidget, a smartfactory, a property, a propertylist, an extension and an extensionfactory, as more fully detailed in the Table 3 below. The use of these extensions is to provide additional interfaces to the application programmer other than the component interfaces 332–334, 336, 338, thereby making the interfaces more expandable. The manner of making these extensions is detailed in Table 3.

TABLE 3

Other Interfaces:
// SmartView.idl : IDL source for SmartView.dll
//
// This file will be processed by the MIDL tool to
// produce the type library (SmartView.tlb) and marshalling code.
import "oaidl.idl";
import "ocidl.idl";
    [
        object,
        uuid(4E08E3E3-917D-11D1-A290-00C04FB6CD35),
        dual,
        helpstring("IMFString Interface"),
        pointer_default(unique)
    ]
    interface IMFString : IDispatch
    {
        [id(1), helpstring("method SetValue")] HRESULT
    SetValue([in] BSTR bstrNewValue, short uIndex);
        [id(2), helpstring("method GetCount")] HRESULT
    GetCount([out, retval] short* pCount);
        [id(3), helpstring("method GetValue")] HRESULT GetValue([in]
    short uIndex, [out, retval] BSTR* pStringOut);
    };
[
        object,
        uuid(62D197A0-0ABF-11D2-A291-00C04FB6CD35),
        dual,
        helpstring("ISmartProperty Interface"),
        pointer_default(unique)
]
interface ISmartProperty : IDispatch
{
        [id(1), helpstring("method GetName")]
    HRESULT GetName([out, retval] BSTR* pstrPropertyName);
        [id(2), helpstring("method GetDescription")]
    HRESULT GetDescription([out, retval] BSTR* pstrPropertyDesc);
        [id(3), helpstring("method SetValue")]
    HRESULT SetValue([in] VARIANT vDataValue);
        [id(4), helpstring("method GetValue")]
    HRESULT GetValue([out] VARIANT* pDataValueOut,
        [out, retval] short* psFieldType);
        [id(5), helpstring("method Advise")]
    HRESULT Advise([in] IUnknown* pSmartNotifySink);
        [id(6), helpstring("method Unadvise")]
    HRESULT Unadvise( );
        [id(7), helpstring("method GetFieldType")]
    HRESULT GetFieldType([out,retval] short* pFieldType);
        [id(8), helpstring("method GetPropertyType")]
    HRESULT GetPropertyType([out,retval] short* pPropertyType);
};
[
        object,
        uuid(344AC98A-EFC4-11D1-A291-00C04FB6CD35),
        dual,
        helpstring("ISmartPropertyList Interface"),
        pointer_default(unique)
]
interface ISmartPropertyList : IDispatch
    {
        [id(1), helpstring("method GetCount")]
    HRESULT GetCount([out, retval] short* pPropertyCount);
        [id(2), helpstring("method GetNameByIndex")]
    HRESULT GetNameByIndex([in] short sIndex,
        [out, retval] BSTR* pstrPropertyName);
        [id(3), helpstring("method GetNames")]
    HRESULT GetNames([out,retval] IMFString** ppNames);
        [id(4), helpstring("method GetDescription")]
    HRESULT GetDescription([in] short sIndex,
        [out,retval] BSTR* pstrDescription);
        [id(5), helpstring("method GetDescriptionByName")]
    HRESULT GetDescriptionByName([in] BSTR strPropertyName,
        [out, retval] BSTR* pstrPropertyDesc);
        [id(6), helpstring("method GetProperty")]
    HRESULT GetProperty([in] short sIndex,
        [out,retval] ISmartProperty** ppProperty);
        [id(7), helpstring("method GetPropertyByName")]
    HRESULT GetPropertyByName([in] BSTR strPropertyName,
        [out,retval] ISmartProperty** ppProperty);
        [id(8), helpstring("method GetPropertyType")]

TABLE 3-continued

```
    HRESULT GetPropertyType(short sIndex, short *pFieldType);
};
[
        object,
        uuid(344AC980-EFC4-11D1-A291-00C04FB6CD35),
        dual,
        helpstring("ISmartWidget Interface"),
        pointer_default(unique)
]
interface ISmartWidget : IDispatch
{
        [id(1), helpstring("method Shutdown")]
    HRESULT Shutdown( );
        [id(2), helpstring("method GetPropertyList")]
    HRESULT GetPropertyList([out, retval]
    ISmartPropertyList** ppPropertyList);
        [id(3), helpstring("method Initialize")]
    HRESULT Initialize( );
        [id(4), helpstring("method GetChildCount")]
    HRESULT GetChildCount([out, retval] short* psCount);
        [id(5), helpstring("method GetChild")]
    HRESULT GetChild([in] short sIndex,
        [out,retval] ISmartWidget** ppChildWidget);
        [id(6), helpstring("method AddChild")]
    HRESULT AddChild([in] BSTR strSourceUrl,
        [in] BSTR strDefName,
        [out, retval] ISmartWidget** ppChildWidget);
        [id(7), helpstring("method GetName")]
    HRESULT GetName([out, retval] BSTR* pstrWidgetName);
        [id(8), helpstring("method GetVRMLString")]
    HRESULT GetVRMLString([out, retval] BSTR* pstrVRML);
        [id(9), helpstring("method AddChild2")]
    HRESULT AddChild2([in] ISmartWidget* pChildWidget);
        [id(10), helpstring("method GetPropertyByName")]
    HRESULT GetPropertyByName([in] BSTR strPropertyName,
        [out,retval] ISmartProperty** ppProperty);
        [id(11), helpstring("method RemoveChild")]
            HRESULT RemoveChild(short sIndex, ISmartWidget **pRemoved);
};
[
        object,
        uuid(DCCBEA22-2AEE-11D2-A298-00C04FB6122D),
        dual,
        helpstring("ISmartFactory Interface"),
        pointer_default(unique)
]
interface ISmartFactory : IDispatch
{
        [id(1), helpstring("method CreateBlankWorldWidget")]
    HRESULT CreateBlankWorldWidget([
        [out,retval] ISmartWidget **ppWorldWidget);
        [id(2), helpstring("method CreatFieldType")]
    HRESULT CreatFieldType([in] short sFieldType,
        [out,retval] IUnknown **ppNewField);
        [id(3), helpstring("method CreateSmartExtension")]
    HRESULT CreateSmartExtension([in] BSTR IpGuid,
        [out,retval] IUnknown **pSmartEx);
        [id(4), helpstring("method CreateSmartWidget")]
    HRESULT CreateSmartWidget([in] BSTR bsUrl,
    [in] BSTR bsDefName, [in] BSTR bdFieldValues,
    [out,retval] ISmartWidget **ppNewWidget);
};
typedef
[
        uuid(5C6BD5A0-E653-11d1-A291-00C04FB6CD35),
        helpstring("Field Type constants")
]
enum {
        [helpstring("Unknown Field Type")]
        UnknownType = 0,
        [helpstring("SFBool Field Type")]
        SFBool          = 1,
        [helpstring("SFImage Field Type")]
        SFImage         = 2,
        [helpstring("SFTime Field Type")]
        SFTime          = 3,
        [helpstring("SFColor Field Type")]
        SFColor         = 4,
        [helpstring("MFColor Field Type")]
```

TABLE 3-continued

```
        MFColor           = 5,
        [helpstring("SFFloat Field Type")]
        SFFloat           = 6,
        [helpstring("MFFloat Field Type")]
        MFFloat           = 7,
        [helpstring("SFInt32 Field Type")]
        SFInt32           = 8,
        [helpstring("MFInt32 Field Type")]
        MFInt32           = 9,
        [helpstring("SFNode Field Type")]
        SFNode            = 10,
        [helpstring("MFNode Field Type")]
        MFNode            = 11,
        [helpstring("SFRotation Field Type")]
        SFRotation        = 12,
        [helpstring("MFRotation Field Type")]
        MFRotation        = 13,
        [helpstring("SFString Field Type")]
        SFString          = 14,
        [helpstring("MFString Field Type")]
        MFString          = 15,
        [helpstring("SFVec2f Field Type")]
        SFVec2f           = 16,
        [helpstring("MFVec2f Field Type")]
        MFVec2f           = 17,
        [helpstring("SFVec3f Field Type")]
        SFVec3f           = 18,
        [helpstring("MFVec3f Field Type")]
        MFVec3f           = 19,
        [helpstring("MFTime Field Type")]
        MFTime            = 20,
} FieldTypes;
Iinterface IG3dProperty : IUnknown
        HRESULT Initialize(LPUNKNOWN pObject, BSTR strName, BSTR strDesc,short sType, short g3dPropId);
        HRESULT ExtensionObject([out, retval] LPUNKNOWN *pVal);
        HRESULT ExtensionObject([in] LPUNKNOWN newVal);
        HRESULT GetStringValue(BSTR* newVal);
        HRESULT SetValue([in] VARIANT vDataValue);
        HRESULT GetValue([out] VARIANT* pDataValueOut, [out, retval] short* psFieldType);
        HRESULT GetName([out, retval] BSTR* pstrPropertyName);
        HRESULT GetDescription([out, retval] BSTR* pstrPropertyDesc);
        HRESULT GetFieldType([out,retval] short* pFieldType);
        HRESULT GetPropertyType([out,retval] short* pPropertyType);
}
interface IG3dPropertyList : IUnknown
{
        HRESULT GetCount([out, retval] short* pPropertyCount);
        HRESULT GetNameByIndex([in] short sIndex, [out, retval] BSTR* pstrPropertyName);
        HRESULT GetDescription([in] short sIndex, [out,retval] BSTR* pstrDescription);
        HRESULT GetDescriptionByName(BSTR strPropertyName, BSTR* pstrPropertyDesc);
        HRESULT GetProperty([in] short sIndex, [out,retval] IG3dProperty** ppProperty);
        HRESULT GetPropertyByName( BSTR strPropertyName, IG3dProperty** ppProperty);
        HRESULT GetPropertyType(short sIndex, short *pFieldType);
        HRESULT AddProperty(IG3dProperty* pProp);
};
interface IG3dExtension : IUnknown
{
        HRESULT SetPropertyValue(IG3dProperty* pProp. VARIANT vVarIn);
        HRESULT GetPropertyValue(IG3dProperty* pProp. VARIANT* pVarOut);
        HRESULT GetPropertyList([out, retval] IG3dPropertyList** ppPropertyList);
        HRESULT G3dObject([out, retval] LPUNKNOWN *pVal);
        HRESULT G3dObject([in] LPUNKNOWN newVal);
        HRESULT GetPropertyByName(BSTR strPropertyName, IG3dProperty** ppProperty);
};
interface IG3dExtensionFactory : IUnknown
{
        HRESULT CreateG3dExtension(CLSID clid, BSTR bsUrl, IG3dExtension** ppObj);
};
```

Figure 5:
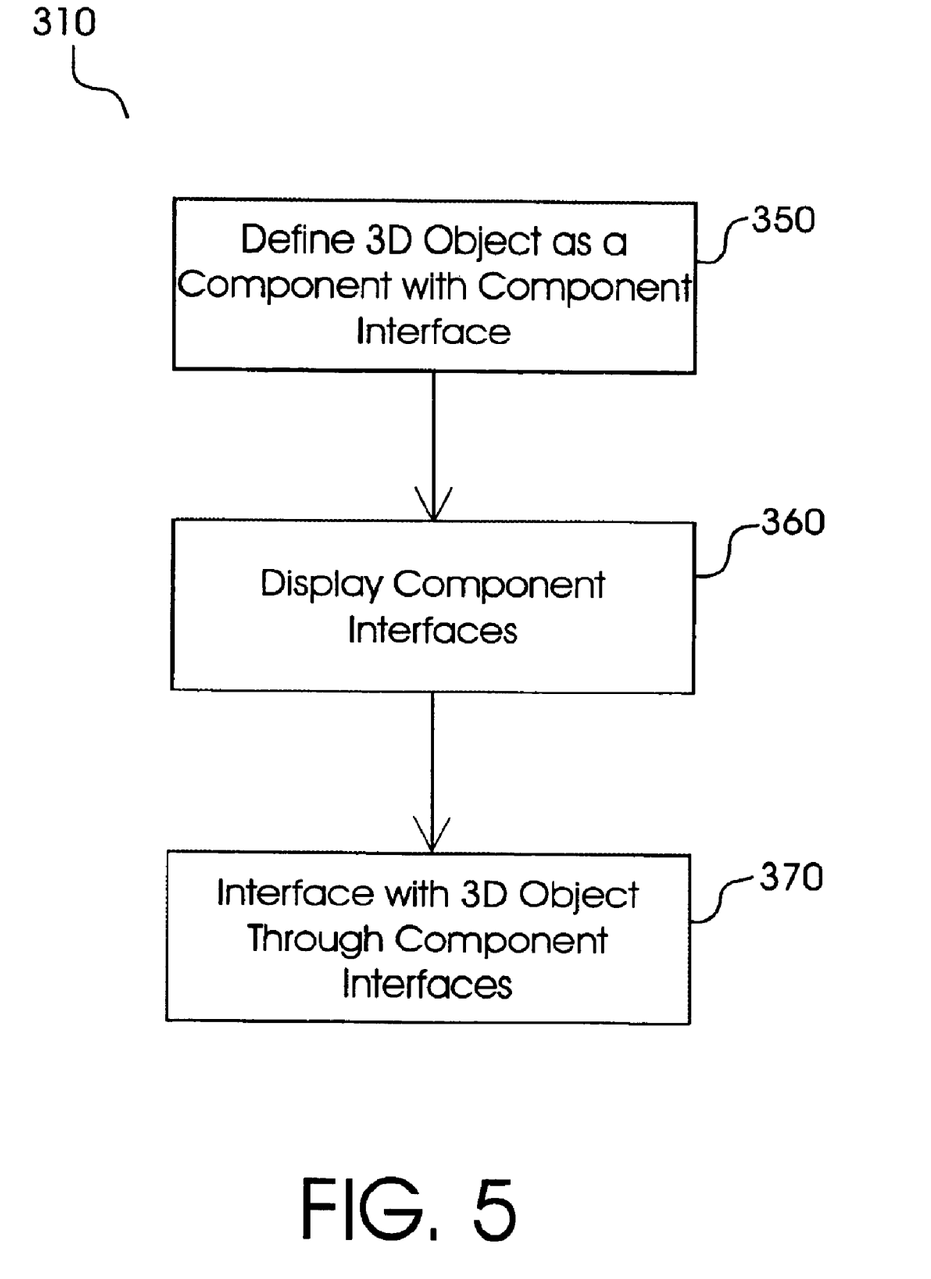
FIG. 5 is a flow chart of the method of interfacing with a three-dimensional object of the present invention.

FIG. 5 is a flow chart of the method of the present invention. At block 350, the first step of the method of the present invention includes defining a 3D object as a component with a component interface. In one embodiment, the defining step 350 is performed in a three-dimensional content language, such as VRML, and includes the steps of defining the component in the three-dimensional content language and defining at least one property to describe the component. Examples of the properties that describe the component may be found in Table 1 which is the 3D content 300. The properties, sometimes referred to as fields in VRML, generally include color, shape, transformation, behavioral, event handling, and grouping. Also at step 350 is defined at least one route to interface the component with a second component (not shown). A second component may represent any other three-dimensional object other than the original three-dimensional object (e.g. cube 340 of FIG. 4) to which a user wants to connect, or otherwise move the second component in relation to the original component. The routes include events and actions. An event is a message that is sent by a specific object in the 3D Content 300. An action receives that message and performs a function based the event received. The route is a mechanism that connects the event to the action. The properties and routes of the present invention are all included in the 3D content 300 of FIG. 4 (Table 1) and are considered "intelligent" content. That is, the 3D content needs no additional scripting to define the content or provide interface with the 3D content. Thus, the 3D content, or VRML describing the three-dimensional object, is considered "intelligent" when all the properties, routes, and definitions are provided within the 3D content 300 or VRML itself. This is unlike other 3D languages which require external scripting to create to content as well as external scripting to interface with the 3D content or with other applications and as such are not considered "intelligent."

Returning to FIG. 5, the next step 360 displays the component interfaces 331 of FIG. 4. The display is typically done on a monitor of a computer system but may also be displayed on any type of display means that may display a three-dimensional object. Such devices include CRT, LCD, a computer screen, a television, a projection screen and the like, or any other display device where digitally rendered representations are presented visually. The displaying step 360 is an important step in the practical implementation and function of the present invention that transforms the method of the present invention into an interfaceable means with a user. As such, the computer program is a practical application for interfacing with a three-dimensional object and acts as a programmed computer that functions as an interface between a user and a 3D object, without having to know the program language, e.g. VRML, of the 3D content. The computer has thus, through the method of the present invention, been transformed into an interface with complicated VRML.

The next step of FIG. 5 of the method of the present invention includes interfacing with a three-dimensional object through the component interfaces. The interfacing is performed, in one embodiment, by first providing a plurality of the component interfaces to the user on a display and then the user selects one of the plurality of the component interfaces to access the 3D intelligent content 300 (FIG. 4). The user is able to select one of the plurality of the component interfaces through, in one embodiment, the interface devices of the computer system of FIG. 3 including an alpha-numeric keypad or a pointing device such as a mouse, trackball, stylus, cursor or direction keys. The application developer or user is thereby able to interface with the three-dimensional object through the selected one of the plurality of component interfaces.

In another embodiment, the present invention may be implemented using a conventional general purpose computer, such as the computer system of FIG. 3, or a specialized digital computer or microprocessor programmed according to the teachings of the present disclosure, as will be apparent to those skilled in computer art. Appropriate software coding can readily be prepared by skilled programmers based on teaching of the present disclosure, as will be apparent to those skilled in the software art. The invention may also be implemented by the preparation of the application specific integrated circuits or by interconnecting an appropriate network of conventional component circuits, as will be readily apparent to those skilled in the art.

In a further embodiment, the present invention also includes a computer program product which is a storage medium (media) having instructions stored thereon/in which can be used to program a computer to perform the method of interfacing of the present invention. The storage medium can include, but is not limited to, any type of disk including floppy disks, optical disks, DVD, CD ROMs, magnetic optical disks, RAMs, EPROM, EEPROM, magnetic or optical cards, or any type of media suitable for storing electronic instructions. On such medium/media, the computer program, 3D content, EAI and COM wrapper of FIG. 4 may be electronically stored.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems and user applications. Ultimately, such computer readable media further includes software for performing the method of interfacing of the present invention as described above.

In a still further embodiment, the present invention also includes an apparatus for interfacing with a three-dimensional object that is displayed. A three-dimensional object is displayed on a monitor or other displaying means as described above, including a CRT display, LCD display, computer monitor, a screen, a projection device or the like. The apparatus first includes a means for defining the three-dimensional object as a component. Such means includes any type of disk including floppy disks, optical disks, DVD, CD ROMs, magnetic optical disks, RAMs, EPROM, EEPROM, magnetic or optical cards, or any type of media suitable for storing electronic instructions. The electronic instruction stored in that defining means includes the 3D content 300, EAI 315, computer program 310 and COM wrapper 320, in one embodiment. The apparatus further includes, in this embodiment, a means for displaying the component interfaces 331. The means for displaying the component interfaces is typically a monitor; however, other displaying means may be used, including a CRT display, LCD display, computer monitor, television monitor, other monitors, a screen, a projection device or the like.

The apparatus of the present invention further includes a means for interfacing with the 3D object through the component interfaces. Such interfacing means includes a display means, as described above, to view the 3D object, storage means to store the 3D content 300, EAI 315, computer program 310, and COM wrapper 320 and a processor 230. In another embodiment, the interfacing means may further include an alpha-numeric keypad for inputting alpha-numeric and other ° key information, or a pointing device, such as a mouse, a trackball, stylus, or cursor direction keys.

In another embodiment, the method of the present invention may be performed over a data network. That is, the defining step 350 of FIG. 5 defines the three-dimensional object as a component in a three-dimensional content language, where the component has component interfaces and intrinsically has intelligent content. The displaying step 360 of displaying the component interfaces is then performed by transferring an electronic signal over a network (e.g. a data network such as the Internet, a frame relay network, an ATM, or even a local area network that transfers the electronic signal over such network). The electronic signal transfers, for example, the 3D content 300, the computer program 310, the COM wrapper 320 and the EAI 315 over the network. It is understood, however, that one or more of these items may be transferred over the network alone, or in conjunction, and achieve the method of the present invention as claimed below. Once the electronic signal has been transferred over the network, the interfacing step 370 may be performed of interfacing with the 3D object through the component interfaces using the interfacing means and substeps of interfacing previously described above with regard to other embodiments. It is important to understand that merely transferring the computer program 310 and related items over a network, rather than as part of a computer system, such as shown in FIG. 3, does not avoid the scope of the present invention as claimed below.

Obviously, numerous modification and variations of the present invention are possible in light of the above teachings. It is therefore to be understood that within the scope of the attended claims, the invention may be practiced otherwise than specifically described herein.

What is claimed is:

1. A method for interfacing with a three-dimensional object that is displayed, said method comprising:
   defining a three-dimensional object as a component, said component being defined by a three-dimensional content language that includes three-dimensional content and interfacing content, said interfacing content being interfaced with said three-dimensional content without external interfacing scripting; and
   displaying a component interface, said component interface being interactive with said three-dimensional content such that an application developer is interfacing with said three-dimensional object through said component interface.

2. The method of claim 1, wherein said defining said three-dimensional object comprises:
   defining an at least one property to describe said component; and
   defining an at least one route to interface said component with a second component, so that said at least one property and said at least one route comprise a portion of said interfacing content.

3. The method of claim 2, wherein said three-dimensional content language is a virtual reality modeling language.

4. The method of claim 2, wherein said at least one property is selected from the group consisting of color, shape, transformation, behavioral, event handling and grouping.

5. The method of claim 2, wherein said at least one route is selected from the group consisting of event and action as an event model for the component.

6. The method of claim 1, wherein said component interface is selected from the group consisting of group, pickable, transformable, colorable and texture.

7. The method of claim 1, wherein said component interface is selected from the group consisting of a smartproperty list, a smartproperty, a smartwidget, a smartfactory, a property, a propertylist, an extension and an extensionfactory.

8. The method of claim 1, wherein said displaying said component interface comprises displaying said component interface on a cathode ray tube display.

9. The method of claim 1, further comprising:
   displaying a plurality of component interfaces;
   selecting one of said plurality of component interfaces.

10. The method of claim 1, wherein said component interface is interactive with said three-dimensional content through said interfacing content.

11. An apparatus for interfacing with a three-dimensional object that is displayed, comprising:
   means for defining a three-dimensional object as a component, said component being defined by a three-dimensional content language that includes three-dimensional content and interfacing content, said interfacing content being interfaced with said three-dimensional content without external interfacing scripting; and
   means for displaying a component interface, said component interface being interactive with said three-dimensional content such that an application developer is interfacing with said three-dimensional object through said component interface.

12. The apparatus of claim 11, wherein said defining means comprises a computer readable medium having a computer program stored therein.

13. The apparatus of claim 11, wherein said displaying means comprises a cathode ray tube display.

14. The apparatus of claim 12, wherein said computer program is written in a virtual reality modeling language.

15. A computer system for interfacing with a three-dimensional object that is displayed, comprising:
   a means for displaying said three-dimensional object;
   a memory for storing a computer program for interfacing with a three-dimensional object displayed on said displaying means, said computer program capable of:
   defining a three-dimensional object as a component, said component being defined by a three-dimensional content language that includes three-dimensional content and interfacing content, said interfacing content being interfaced with said three-dimensional content without external interfacing scripting; and
   displaying a component interface on said displaying means, said component interface being interactive with said three-dimensional content such that an application developer is interfacing with said three-dimensional object through said component interface; and
   a processor for executing said computer program in conjunction with said monitor.

16. The computer system of claim 15, wherein said defining said three-dimensional object comprises:
   defining an at least one property to describe said component; and
   defining an at least one route to interface said component with a second component, so that said at least one property and said at least one route comprise a portion of said interfacing content.

17. The computer system of claim 16, wherein said three-dimensional content language is a virtual reality modeling language.

18. The computer system of claim 15, wherein said component interface is selected from the group consisting of group, pickable, transformable, colorable and texture.

19. The computer system of claim 15, wherein said component interface is selected from the group consisting of a smartproperty list, a smartproperty, a smartwidget, a smartfactory, a property, a propertylist, an extension and an extensionfactory.

20. The computer system of claim 15, further comprising:
   displaying a plurality of component interfaces; and
   selecting one of said plurality of component interfaces.

21. A computer readable medium having a computer program stored thereon that, when loaded into a computer, cause said computer to perform a function for interfacing with a three-dimensional object displayed on said computer, said computer interfacing with said three-dimensional object by:

defining a three-dimensional object as a component, said component being defined by a three-dimensional content language that includes three-dimensional content and interfacing content, said interfacing content being interfaced with said three-dimensional content without external interfacing scripting; and displaying a component interface, said component interface being interactive with said three-dimensional content such that an application developer is interfacing with said three-dimensional object through said component interface.

22. The computer readable medium of claim 21, wherein said defining said three-dimensional object comprises:

defining an at least one property to describe said component; and defining an at least one route to interface said component with a second component, so that said at least one property and said at least one route comprise a portion of said interfacing content.

23. The computer readable medium of claim 22, wherein said three-dimensional content language is a virtual reality modeling language.

24. The computer readable medium of claim 21, wherein said component interface is selected from the group consisting of group, pickable, transformable, colorable and texture.

25. The computer readable medium of claim 21, wherein said component interface is selected from the group consisting of a smartproperty list, a smartproperty, a smartwidget, a smartfactory, a property, a propertylist, an extension and an extensionfactory.

26. The computer readable medium of claim 21, further comprising:

displaying a plurality of component interfaces; and selecting one of said plurality of component interfaces.

27. A method for interfacing with a three-dimensional object that is displayed, the method comprising:

defining a three-dimensional object as a component, the component being defined by a three-dimensional content language that includes three-dimensional content and interfacing content, said interfacing content being interfaced with said three-dimensional content without external interfacing scripting;

displaying a component interface, said component interface being interactive with said three-dimensional content such that an application developer is interfacing with the three-dimensional object through the component interface;

providing a property to describe the component; and providing a route to interface the component with a second component.

28. The method of claim 27, wherein the property and the route represent at least a portion of the interfacing content.

29. The method of claim 28 wherein the route permits interfacing the component with a second component.

30. A method for representing a three-dimensional object as a component for interfacing with the three-dimensional object, the method comprising:

defining a three-dimensional object as a component, said component being defined by a three-dimensional content language that includes three-dimensional content and interfacing content, said interfacing content being interfaced with said three-dimensional content without external interfacing scripting, the component includes a property describing the component and a route permitting interface with the component; and displaying a component interface, said component interface being interactive with said three-dimensional content such that an application developer is interfacing with said three-dimensional object through said component interface.

31. A method for representing a three-dimensional object as a component for interfacing with the three-dimensional object, the method comprising:

defining a three-dimensional object as a component, said component being defined by a three-dimensional content language that includes three-dimensional content and interfacing content, said interfacing content being interfaced with said three-dimensional content without external interfacing scripting, the component includes at least one property describing the component, and at least one route permitting interface with the component, the at least one property and the at least one route representing at least a portion of said three-dimensional content;

defining a plurality of component interfaces; and displaying the component interfaces, said component interfaces being interactive with said three-dimensional content such that an application developer is interfacing with said three-dimensional object through said component interfaces.

32. A method for representing a three-dimensional object as a component for interfacing with the three-dimensional object, the method comprising:

defining a plurality of component interfaces; and defining a three-dimensional object as a component, said component being defined by a three-dimensional content language that includes three-dimensional content and interfacing content, said interfacing content being interfaced with said three-dimensional content without external interfacing scripting, said three-dimensional content comprised at least in part by a plurality of properties and a plurality of routes, the properties describing the component and the routes permitting interface with the component.

33. A method for interfacing with a three-dimensional object over a network, said method comprising:

defining a three-dimensional object as a component, said component being defined by a three-dimensional content language that includes three-dimensional content and interfacing content, said interfacing content being interfaced with said three-dimensional content without external interfacing scripting;

transmitting at least a portion of said component over a network; and displaying a component interface, said component interface being interactive with said three-dimensional content such that an application developer is interfacing with said three-dimensional object through said component interface.

34. The method of claim 33, wherein said transmitted portion of said component is at least a portion of said three-dimensional content.

35. The method of claim 33, wherein said transmitted portion of said component is at least a portion of said interfacing content.

* * * * *